(12) United States Patent
Hong

(10) Patent No.: US 7,482,081 B2
(45) Date of Patent: Jan. 27, 2009

(54) BATTERY SYSTEM WITH IN-SITU AND ON-TIME CONTINUOUS REGENERATION OF THE ELECTRODES

(76) Inventor: Zongxuan Hong, 4043 Elm Crest Trl., Houston, TX (US) 77059

( * ) Notice: Subject to any disclaimer, the term of this patent is extended or adjusted under 35 U.S.C. 154(b) by 229 days.

(21) Appl. No.: 11/049,398

(22) Filed: Feb. 2, 2005

(65) Prior Publication Data

US 2005/0175877 A1    Aug. 11, 2005

Related U.S. Application Data

(60) Provisional application No. 60/543,798, filed on Feb. 11, 2004.

(51) Int. Cl.
*H01M 4/00* (2006.01)
*H01M 10/42* (2006.01)
*H01M 2/36* (2006.01)
*H01M 4/36* (2006.01)
*H01M 6/24* (2006.01)
*H01M 4/48* (2006.01)
*H01M 6/20* (2006.01)
*H01M 4/42* (2006.01)
*H01M 4/58* (2006.01)

(52) U.S. Cl. .............................. 429/27; 429/49; 429/72; 429/229; 429/101; 429/105

(58) Field of Classification Search .................. 429/27, 429/49, 72
See application file for complete search history.

(56) References Cited

U.S. PATENT DOCUMENTS

2004/0053132 A1 *    3/2004    Smedley et al. ............. 429/229

\* cited by examiner

*Primary Examiner*—Patrick Ryan
*Assistant Examiner*—Eugenia Wang

(57) ABSTRACT

The battery system of this invention continuously regenerates the electrodes of the battery in-situ and on-time as the electrodes are consumed during discharge, which concurrently generate electric current. The continuous in-situ and on-time regeneration of the anode is achieved by a supply of reducing materials in the battery compartment that is in contact with the anode. With the use of high energy density reducing materials, the energy density of the battery system is increased significantly. When the reducing materials are consumed, the reducing materials can be replaced with a supplying device. With the use of specially designed supplying devices for reducing materials, recharging battery system is more convenient, safe, fast, and can be operated repeatedly.

15 Claims, 3 Drawing Sheets

BATTERY SYSTEM WITH IN-SITU AND ON-TIME CONTINUOUS REGENERATION OF THE ELECTRODES

This application is based on Provisional Application No. 60/543,798, filed Feb. 11, 2004.

FIELD OF INVENTION

This invention relates generally to metal-air storage battery system, and more specifically, to in-situ and on-time continuous regeneration of the anode of the battery as the anode is discharged. This invention further relates to the method of recharging the metal-air storage battery system.

BACKGROUND OF INVENTION

In the area of mobile electronics technology, there is an increasing demand for more compact, long-life, high energy density batteries. In this regard, there have been lots of researches working to meet the needs. For example, Li-ion battery is currently used for most mobile electronics, and there are extensive researches to improve the battery capabilities. However, because of the theoretical limitation of most secondary batteries, the energy density is low, and the lifetime of the battery still does not satisfy the need of power for mobile electronics. In addition, recharging the battery takes a long time.

In the area of transportation, there is also an increasing demand for more powerful, longer-lasting batteries for emission-free electrically powered vehicles owing to increasing environmental regulations for vehicles. In this regard, there are lots of researches working on hydrogen fuel cells and metal-air batteries. While hydrogen fuel cells are promising, there are still lots of technology challenges, such as methods of hydrogen storage and generation, cost of fuel cell electrodes and proton exchange membrane, etc. Metal-air batteries, in particular, zinc-air battery, also show great potential, because metal-air batteries have a high theoretical specific energy. However, many problems need to be solved for zinc-air battery to be used for transportation application. For example, among other issues as reviewed in U.S. Pat. No. 6,630,262, the methods of recharge of the spent anode still need to be improved in the aspect of convenience, durability, etc.

Separately, U.S. Pat. Nos. 5,804,329 and 6,497,973 disclosed an invention of electroconversion cell using boron redox species, and such electrochemical cells are characterized by favorable features, among others, such as specific energy, recharge efficiency, safety. The patents claims an electrochemical storage medium comprising a carrier mixed with a borohydride compound, the borohydride compound being electrochemically oxidized to an oxidized boron-containing compound concurrent with the generation of an electric current, and the storage medium being in electrical contact with an electrode for carrying current generated during that oxidation. However, it is difficult for such electroconversion cell to achieve the concurrently generating electric current from electrochemical oxidation of borohydride compound. For this reason, this invention did not disclose a detailed effective method to achieve a desired electric current.

Further, the inventor also disclosed high energy density boride batteries in U.S. Pat. Nos. 5,948,558 and 6,468,694. In the patents, reduced boron-containing compound is used as anode to yield an electric current when the reduced boron-containing compound being oxidized to oxidized boron-containing compound during battery discharge. This technology overcomes the difficulty in electroconversion of borohydride as anode material. However, the electroconversion is limited by the solubility of oxidized boron-compound during discharge. Therefore, although the reduced boron-containing compounds are high energy density materials used as anodic medium, the battery still cannot achieve high energy density because of low conversion. In these batteries, halogen compounds, in particular, fluoride, need to be used to increase the solubility of the oxidized boron-compound to achieve high conversion and electric current.

As discussed above, there still exist many technological challenges in prior arts for a battery and/or electric power system with a high energy density and longer lifetime, as well as fast and convenient recharging method. The current invention intends to provide a battery system with high energy density, limited volume, longer lifetime and with a safe, easily recharging methods for the battery system, as electric power sources for mobile electronics and transportation vehicles.

SUMMARY OF INVENTION

This invention discloses a metal-air storage battery system for producing electric current, and the metal-air storage battery system comprising an anode, a cathode, an electrolyte, a separator, and a battery anode supplying compartment, in which the anode is continuously regenerated in-situ and on-time for continuous function while the anode is consumed during discharge that concurrently generate electric current. The discharged anode is continuously regenerated in-situ and on-time by a supply of at least one reducing materials in the battery supplying compartment in contact with the anode. With use of high energy density reducing materials, the energy density of the metal-air battery is increased furthermore.

In one embodiment of this invention, the reducing materials are mixed with electrolyte to provide ion conductivity in the battery.

In a preferred embodiment of this invention, the metal-air battery is a zinc-air battery, and the metal anode is zinc. The reducing materials are borohydrides and/or aluminum hydrides, such as sodium borohydride, potassium borohydride, lithium aluminum hydride, sodium aluminum hydride, and potassium aluminum hydride. The reducing materials are mixed with electrolytes such as hydroxides, in particular sodium hydroxides and potassium hydroxides. The energy density of said reducing materials is higher than that of the metal anode. As a result, the battery system of this invention has a higher energy density than the original zinc-air battery. For example, sodium borohydride can reach a theoretical energy density of about 9300 Wh/Kg, as compared to zinc anode of a theoretical value of about 1300 Wh/Kg. Therefore, with use of reducing materials as borohydrides, the energy density of the battery is increased significantly for zinc-air battery.

In another embodiment of this invention, the anode materials of the metal-air battery system comprise at least one type of metal from Periodic Table Group VIII, Group IB, Group IIB, Group IIIA, Group IVA; or alloys of the metals; or mixture of the metals, or a combination thereof; for example, metals such as Zn, Ni, Cu, Fe, Ag, Au, Ga, Sn, Pb, etc.

Also in one embodiment of this invention, the batteries can be connected in series, in parallel, or a combination thereof to create designed battery voltage and current density. The reducing materials are distributed into each cell compartments in the form of solutions.

The reducing materials are replaced in forms of continuous feed through and/or batch, using storage tank, cartridge, and/or other forms of supplying devices after these materials are consumed. This invention also discloses a supplying device for storing the reducing materials, wherein the reducing materials, the electrolyte, or a combination thereof, are stored in the form of dry powder in their specific supplying devices. In addition, the reducing materials can also be stored in the form of dry powder pre-mixed with dry powder of electrolyte, such as hydroxides. The supply devices have a gas relief device, a flexible and expandable volume setup, a liquid injection port, and an open-close gate.

When the battery needs recharging with the supplying device, the supplying device of this invention is inserted into the designed battery compartment, a designed amount of solvent is injected into the supplying device through the liquid injection port to turn the stored materials into solution, and the open-close gate is opened to allow the solution access to the anode. A preferred solvent is water, and the solution is an aqueous solution. This invention reduces the carrying weight and volume of the battery recharging supplying device, increases the safety and convenience for supplying device carrying and handling, and may also increases the storage lifetime of reducing materials.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

Figure 1:
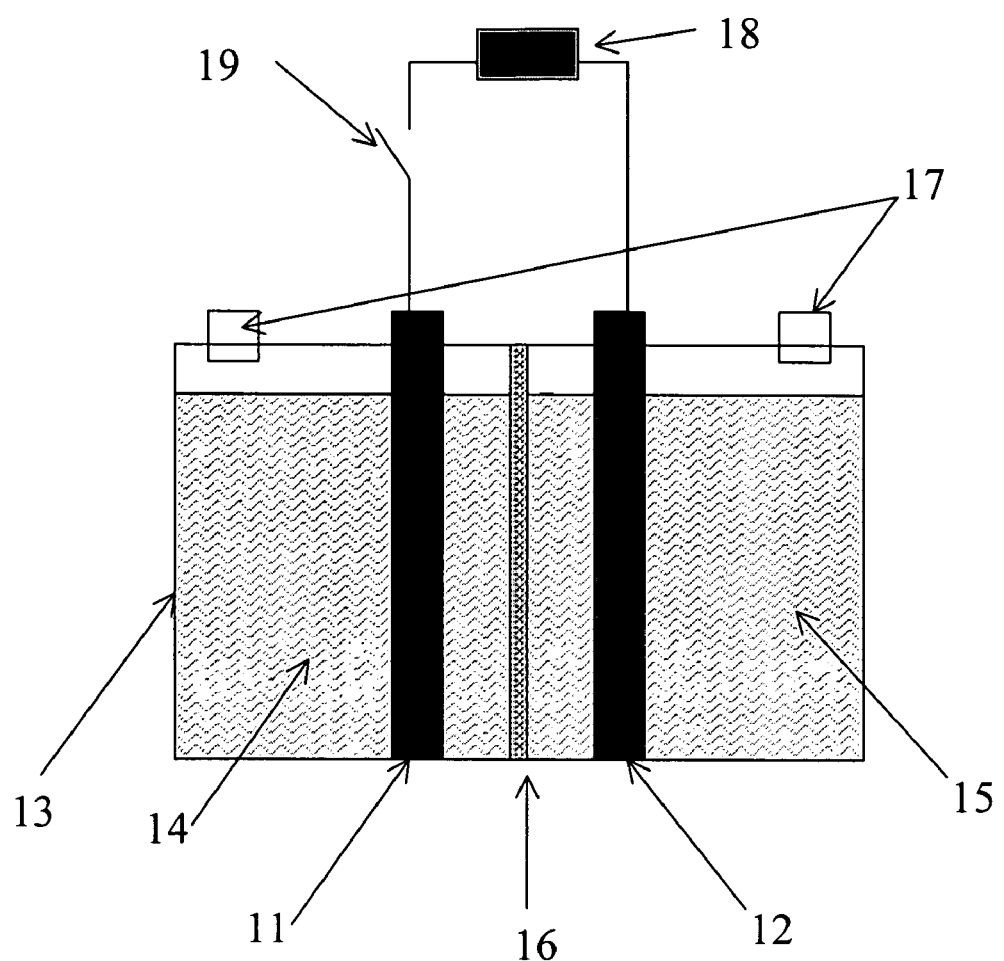
FIG. 1 is a schematic drawing of a battery system having features of this invention, wherein the electrodes are in contacts with reducing materials and oxidizing materials stored in the battery compartment, and said reducing materials and oxidizing materials are separated by a selective membrane separator.

In prior art, a battery comprises of an anode, a cathode, and an electrolyte. During the battery discharge when the anode and the cathode is connected with a load externally, the anode transfers electrons to the cathode generating electric current with anode been oxidized electrochemically to oxidized species and cathode been reduced electrochemically to reduced species. As the discharge proceeds, the anode depletes to oxidized species, resulting not only a decrease in the amount of available anode materials for generating electric current, but also the formation of an oxidized layer that blocks the diffusion of anode species to electrolyte and increases the internal resistance of the battery. Both of these effects decrease the output electric power of the battery.

Specifically in prior art, a metal-air battery comprises of a metal anode, an air cathode, and electrolyte. In the process of discharge, the metal anode transfers electrons through an external circuit to the air cathode generating electric current, and simultaneously the metal anode is electrochemically oxidized to form oxidized species, such as hydroxide and/or oxide, on the surface of the anode. In the mean time, oxygen is reduced to form hydroxyl group in combination with water on the cathode.

The voltage of the battery is determined by the two half electrode reactions.

For zinc-air battery,

| Anode | $Zn \rightarrow Zn^{2+} + 2e$ | $-1.25$ V |
|---|---|---|
|  | ( $Zn^{2+} + 2OH^- \rightarrow Zn(OH)_2$ |  |
|  | $Zn(OH)_2 \rightarrow ZnO + H_2O$ ) |  |
| Cathode | $\frac{1}{2} O_2 + H_2O + 2e \rightarrow 2\ OH^-$ | $0.40$ V |

For the overall reaction, $$Zn + \tfrac{1}{2}O_2 + H_2O \rightarrow Zn(OH)_2$$

The overall voltage of zinc-air battery is 1.65 V.

The change of Standard Gibbs Free Energy is $-317$ kJ/mol, with two moles of electrons transfer. In this electroconversion, the theoretical total voltage is calculated to be 1.65 V, according to Faraday equation (delta $G$)=$n \cdot F \cdot E$, wherein, n is number of electrons in the equation, F is Faraday constant 96500 C/mol, and E is the total voltage of the overall reaction. This reaction also generates a heat of 359 kJ/mol, based on the change of Standard Enthalpy.

On the anode, the oxidized species, in the form of hydroxide and/or oxide, stays on the surface of the anode, thereby creating a barrier for further electrochemical reaction. This barrier also increases the internal resistance of the battery. Specifically for zinc-air battery, during battery discharge, zinc anode transfers electrons through an external circuit to air cathode generating electric current, and simultaneously, zinc is electrochemically oxidized into oxidized species, such as zinc hydroxide and/or zinc oxide. These oxidized zinc species usually stays on the surface of zinc anode, thereby creating a barrier for further electrochemical reaction and increasing the internal resistance. Accordingly, as the battery internal resistance increases, the output voltage and current of the battery decrease.

This invention improves the battery technology in many ways, especially in the aspects of energy density of the battery, extended battery lifetime, high battery output current, and convenience of recharging a battery.

In one aspect of this invention, in addition to the battery technology of prior art wherein the battery comprises of an anode, a cathode, an electrolyte, and a separator, a supplying compartment is built into the battery system to provide reducing materials in contact with the anode, and the anode and the reducing materials are separated with the cathode by a selective membrane separator. The selective membrane allows only certain ions to transfer through, but not the reducing materials to transfer through. According to this invention, during the battery discharge process, in which the anode transfers electrons to the cathode with the anode being oxidized to form oxidized species, the reducing materials in contact with the anode consequently reduce the oxidized anode species back to its reduced form in-situ and on-time. As a result, the regenerated anode can continue to generate electric current and power. One benefit of this invention is that the energy density of the battery is increased significantly when a reducing material with higher energy density than the anode is used.

Another additional benefit of this invention is that the oxidized anode species on the anode are removed from blocking mass transfer and increasing internal resistance by the regeneration process, therefore the output electric current is maintained at its maximum level.

Compared to using reducing materials directly as anode, for a battery in which very specific electrode catalysts are needed to catalyze the electrochemical conversion and the electrode catalysts are required to be very active to facilitate instantaneous power draw from external loads, the technology in this invention will facilitate an instantaneous power draw by the role of the original anode, with the discharged anode been regenerated subsequently. Additionally, the chemical reduction at the anode does not necessarily need to have very specific electrode catalysts. Although adding catalytic materials to accelerate the chemical reduction at the anode is beneficial for the battery in this invention.

In another aspect of this invention, a supplying compartment providing reducing materials is added to a metal-air battery, and the metal anode and the reducing materials are separated with the air cathode by a selective membrane. The selective membrane only allows certain ions to transfer through, but not the reducing materials to transfer through. According to this invention, during the discharge process of a metal-air battery, in which the metal anode transfers electrons to air cathode with the metal anode being oxidized to form oxidized species, the reducing materials in contact with the anode subsequently reduce the oxidized anode species back to its reduced form in-situ and on-time. At cathode, air from environment continuously supplies to an electrode catalyst. As a result, the regenerated anode continues to generate electric current and power. One benefit of this invention is that, with use of high energy density reducing materials, the energy density of the metal-air battery is increased accordingly. Another benefit of this invention is that the oxidized anode species, such as metal hydroxide and/or metal oxide, are removed from blocking mass transfer and increasing internal resistance by continuous in-situ and on-time reduction. As a result, the electric current output is maintained at its maximum level.

Furthermore, compared to using reducing materials directly as anode in which very specific electrode catalysts are used to catalyze the electrochemical conversion and the electrode catalysts are required to be very active to facilitate instantaneous power draw from loads, the technology in this invention will facilitate the instantaneous power draw by the role of original metal anode and air cathode. Additionally, the chemical reduction at anode does not necessarily need to have very specific electrode catalysts. Although adding catalytic materials to accelerate the chemical reduction at anode is beneficial for the battery in this invention.

In an embodiment of this invention, the reaction of the supplying reducing materials with the oxidized species of the anode should be favorable in terms of Gibbs Free Energy change and Enthalpy change at normal battery operation conditions. Accordingly, in a preferred embodiment of this invention, for zinc-air battery system wherein zinc metal is used as anode, borohydrides, such as sodium borohydride, are used as reducing materials.

In prior art of metal-air battery such as zinc-air battery, metal anode, such as zinc anode, is manufactured in fine powders to increase the surface area and decrease the bulk percentage in the anode. In addition, the electrolyte composes an alkaline solution of a high concentration, in particular potassium hydroxide at about 35% w/w.

According to this invention, for zinc-air battery, the reducing material used should be reactive to reduce the zinc hydroxides and/or zinc oxides to zinc or partially reduced zinc species. Borohydrides, such as sodium borohydride, potassium borohydride, are suitable reducing materials, for which the Gibbs Free Energy change of the reduction reaction is favored. Aluminum hydrides, such as lithium aluminum hydride, can also be used as reducing materials for zinc-air storage battery.

Sodium borohydride is suitable for use in metal anode reduction, specifically for zinc-air battery. From thermodynamics point of view, the reduction reaction of sodium borohydride with a possible oxidized zinc species, for example, $Zn(OH)_2$, is favorable at a common battery operating temperature, such as 50 C.

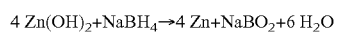

The change of Gibbs Free Energy for the reaction is about −4 kJ/mol.

In this invention, the oxidized metal anode species is reduced in-situ and on-time, and accordingly the layer of oxidized species, for example, metal hydroxides and/or metal oxides, is reduced and removed right after it is formed. And the reduced anode species can continue to transfer electrons to the cathode. Therefore, in a metal-air battery system of this invention, the anode does not need to be in high quantity as a metal-air battery of prior art. Further, the anode does not necessarily be manufactured in the form of fine powder to enhance electroconversion and decrease internal resistance as a metal-air battery of prior art.

In another embodiment of this invention, the metal anode materials of metal-air battery system can be from Periodic Table Group VIII, Group IB, Group IIB, Group IIIA, Group IVA, for example, Fe, Co, Ni, Cu, Zn, Ga, Sn, Pb, etc.

Further, in another embodiment of this invention, mixture of metals can also be used as anode materials in the metal-air battery system. The mixture of metals can be metals from Group VIII, Group IB, Group IIB, Group IIIA, Group IVA, for example, Zn, Ni, Cu, Fe, Ag, Au, Ga, Sn, Pb, etc. The said mixture of metals refers to homogeneous mixture of metals and/or inhomogeneous mixture of metals, such as heterogeneous mixture, doped metals, and other forms of materials with more than one metal species.

Further, in another embodiment of this invention, alloy metal materials can also be used as anode materials in the metal-air battery system. The alloy metal materials can be metals from Group VIII, Group IB, Group IIB, Group IIIA, Group IVA, for example, Zn, Ni, Cu, Fe, Ag, Au, Ga, Sn, Pb, etc.

Further, in another embodiment of this invention, the anode can be a combination of above mentioned metals, mixture of metals, alloy metal materials.

Again in prior art of battery technology, electrolyte is used to assist transfer of ions in the battery. In prior art of metal-air battery, electrolyte, specifically an alkaline solution such as potassium hydroxide, is used.

In an embodiment of this invention, the electrolyte is also used to assist transfer of ions in the battery. The reducing materials are mixed with electrolyte in the battery compartment. Further, since the reducing materials usually are reactive in operation conditions and/or storing conditions, stabilizing materials usually are needed to be added into the said reducing materials to extend the storage lifetime of said materials.

In a preferred embodiment of this invention, borohydrides, such as sodium borohydride, used as reducing materials for metal-air battery system, such as zinc-air battery, are stable at high pH conditions, and therefore, alkaline hydroxides, such as sodium hydroxide and potassium hydroxide, are added to the borohydrides to stabilize the reducing materials and to act as electrolyte for the battery.

In another embodiment of this invention, the anode and the reducing materials are separated with the cathode by a selective semi-permeable membrane, and said semi-permeable membrane is permeable for certain ions in solution, especially, those ions that do not react with the anode and/or cathode.

Specifically in metal-air battery, such as zinc-air battery, the semi-permeable membrane is permeable for ions, such as hydroxyls, alkaline metal ions, but is impermeable for ions responsible for reducing potential, such as borohydride ions, aluminum hydride ions.

The batteries constructed with this invention can be connected in series, in parallel, or a combination thereof. The anode and the cathode in the batteries are connected in series, in parallel, or in a combination of thereof, to achieve the designed voltage and current for applications.

In prior art for recharging a battery, a secondary battery is used wherein an anode is reduced to the reduced form by electrochemical reduction with a supply of external electric power through the electrodes. This recharging process usually takes a long time for the battery being fully recharged. In this aspect, Lead-Acid batteries and Nickel-Cadmium batteries are such secondary batteries with the electrochemical recharging process.

An alternative recharging method is to supply the battery with new anode materials. In this aspect, zinc anode is usually replaced for recharging zinc-air battery.

Similarly in a fuel cell, fresh fuel is supplied to the electrochemical cell in the form of continuous feed or batches. In this aspect, hydrogen fuel cell and direct methanol fuel cell use this approach for recharging the electrochemical cell.

In a metal-air storage battery system of this invention, wherein the anode is continuously regenerated in-situ and on-time for continuous function with a supply of at least one type of reducing materials in the battery supplying compartment in contact with the anode, and said reducing materials in the battery supplying compartment are mixed with electrolyte and/or stabilizing materials and are in the form of solution. However, solution is usually heavy in weight, large in volume, and difficult to handle such as carrying.

In this invention, reducing materials and can also be first prepared in the form of dry powers, and stored in their specific supplying devices. The reducing materials are pre-mixed with dry powder of an electrolyte material, such as hydroxides, and if necessary with a stabilizing material for these materials. The supply device has a gas relief device, a flexible and expandable volume setup, a liquid injection port, and an open-close gate.

When the battery needs recharging with the supplying device, the supplying device of this invention is inserted into the battery compartment, a designed amount of solvent, for example, water is injected into the supplying device through the liquid injection port to turn the stored materials into a solution, and the open-close gate is opened to allow the solution access to the anode.

The benefit of this invention is that the method disclosed in this invention reduces significantly the carrying weight and volume of the battery recharging supplying device, and increases the safety and convenience for supplying device carrying and handling. The storing method disclosed in this invention may also increase the storage lifetime of the reducing materials.

In an embodiment of this invention, the recharging reducing materials, such as sodium borohydride and potassium borohydride, are prepared as a mixture of dry powders with electrolytes, such as alkaline hydroxides, e.g., sodium hydroxide and potassium hydroxide. The appropriate composition of borohydrides with alkaline hydroxides in the mixture is in the range of 10.00% to 99.99% in weight percentage. The preferred composition of reducing materials in the mixture is in the range of 60.00% to 99.90% in weight percentage. The preferred electrolytes are hydroxides, for example, sodium hydroxide and potassium hydroxide.

In another embodiment of this invention, since the dry powders of reducing materials have much smaller volume than the solution form at usage, the storage device can be made in a small yet flexible and expandable container. Before the solvent is added to the reducing materials for usage, the container is compressed in a small volume. In this storage form, carrying the recharging device is convenient and safe. The recharging device also has a much lower weight and/or lower volume than the one with solution. Further, because the reducing materials, such as borohydrides, are usually more stable in the dry powder form, the recharging method of this invention increases significantly the storage lifetime of recharging device.

In one embodiment of this invention, the preferred solvent is water, and the solution is an aqueous solution.

For recharging the battery system of this invention, the user can add water, which is readily available, into the storage device through the injection port to dissolve the reducing materials into aqueous solution. The supplying device is then inserted into the designed battery compartment, and the aqueous solution is ready for function when the open-close gate is open to allow the aqueous solution in contact with the anode.

The principles, concepts, and operations of the battery system according to this invention may be better understood with references to the figures and accompanying descriptions.

FIG. 1 shows a schematic drawing of a battery system having the features of this invention, wherein the electrodes are in contacts with reducing materials and/or oxidizing materials stored in the battery compartment, and said reducing materials and/or oxidizing materials are separated by a selective membrane separator. 11 is the anode of the battery, 12 is the cathode of the battery, with 13 being the battery case in which the battery compartments are contained for storage of reducing materials and oxidizing materials. In the battery compartment 14, the solution of a mixture of reducing materials and electrolyte is in contact with the anode; and in the battery compartment 15, the solution of a mixture of oxidizing materials and electrolyte is in contact with the cathode. The solution in compartment 14 and the solution in compartment 15 are separated by a selective membrane separator 16. In the battery compartment, there are pressure relief valves 17 in both battery compartments for reducing materials and oxidizing materials to prevent battery over-pressure. The anode 11 and the cathode 12 are connected externally with a load 18, and the circuit is controlled by a switch 19.

Figure 2:
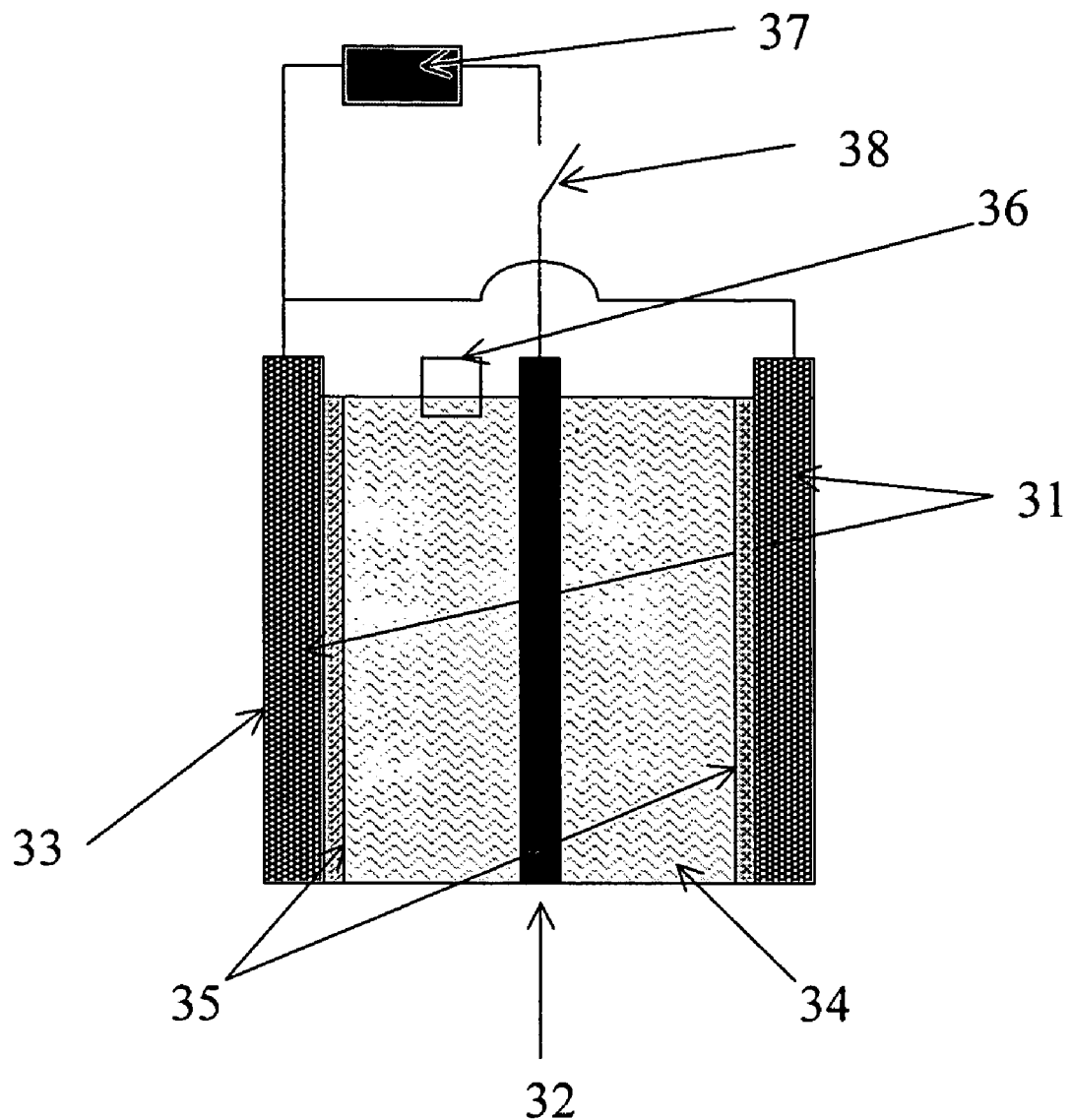
FIG. 2 is a schematic drawing of a metal-air storage battery system having features of this invention, wherein the anode is in contact with the reducing materials stored in the battery compartment, and said reducing materials are separated with cathode by a selective membrane separator.

FIG. 2 is a schematic drawing of a metal-air storage battery having the features of this invention, wherein the anode is in contact with the reducing materials stored in the battery compartment, and said reducing materials are separated with cathode by a selective membrane. 31 are the cathodes with proper gas diffusion electrode catalyst and current carrier. 32 is the metal anode, and 33 is the battery case in which the battery compartment is contained for storage of reducing materials. 34 represents the solution with reducing materials and electrolyte. 35 is the selective membrane that separates the reducing materials with the cathode. 36 is a pressure relief valve. The anode 32 and the cathodes 31 are connected externally with a load 37, and the circuit is controlled by a switch 38.

Specifically in a preferred embodiment of this invention, the metal anode is zinc, and reducing material is sodium borohydride mixed with sodium hydroxide as electrolyte. When switch 38 is closed, the battery begins to discharge which generate electric current, and in the mean time, zinc is electrochemically oxidized to zinc hydroxide and/or zinc oxide. The sodium borohydride in the battery compartment in contact with zinc will then reduce oxidized zinc species in-situ and on-time to reduced zinc species for continuous function as anode.

Figure 3:
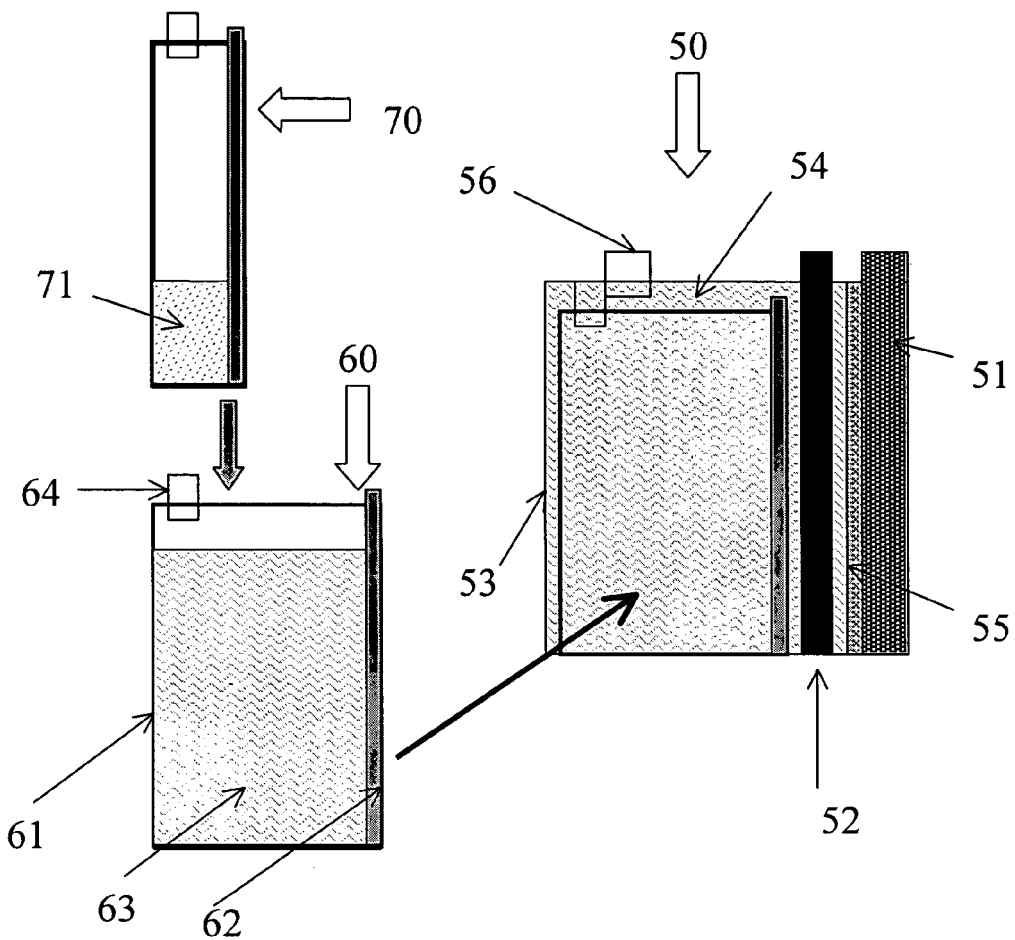
FIG. 3 is a schematic drawing of a supplying device as a storage vessel for the reducing materials used for metal-air storage battery.

FIG. 3 is a schematic drawing of a supplying device as storage vessel for reducing materials used for metal-air storage battery. 50 is another schematic drawing of a metal-air battery, wherein 51 is the air cathode with proper gas diffusion electrode catalyst and current carrier, 52 is the metal anode, and 53 is the battery case. 54 represents the solution with reducing materials and electrolyte. 55 is the selective membrane that separates the reducing materials with the cathode. 56 is a pressure relief valve. 60 is the supplying device for reducing materials and electrolyte. In this supplying device, 61 is the supplying device case, 62 is an open-close gate, and 64 is a liquid injection port. 63 represents the solution after the powder reducing materials and electrolyte are dissolved in solvent, such as water. 70 is the supplying device with flexible and expandable volume in which the mixture of reducing materials and electrolyte are stored in the form of dry powder. 71 represents the dry powder mixture of reducing materials and electrolyte. The recharge reducing materials and electrolyte mixture are stored as dry powder in compacted supplying device 70. Before recharging the battery, supply device 70 is expanded to full size as 60, and water is injected through injection port 64, and dry powder 65 is dissolved into aqueous solution 63. With previous supplying device taken out, this new supplying device 60 is then inserted into metal-air battery 50. Then gate 62 is opened to allow the reducing material solution to be in contact with the metal anode.

The following examples demonstrate the improved features of the battery system disclosed in this invention. In a zinc-air battery, the in-situ and on-time continuous regeneration of zinc anode with reducing materials, for example, sodium borohydride, provides continuous generation of electric current. Further, the electric current generated from the in-situ and on-time anode regeneration is maintained at a level similar to the electric current generated from a fresh zinc-air battery. The examples are given solely for the illustration purposes and are not to be construed as a limitation of the present invention.

EXAMPLE 1

A regular zinc-air battery is tested as a base case. In the zinc-air battery used, the zinc anode is a piece of zinc metal with an area of about 4 cm$^2$, and the cathode is an air electrode with an area of about 2 cm$^2$. The air electrode catalyst is MnO$_2$ supported on carbon. The electrolyte used in the test is sodium hydroxide aqueous solution with concentration of about 3 wt. %.

The open circuit voltage is measured to be about 1.6 V, which is close to the value of zinc-air battery. When the anode and cathode is electrically connected with a load of 1 ohm, the electric current density started to be about 100 mA/cm$^2$ of anode, and decreased gradually to about 15 mA/cm$^2$, and kept decreasing slowly. This data shows that the zinc anode surface is oxidized to form oxidized species, such as zinc hydroxide and/or zinc oxide, during battery discharge. This result is in general agreement with the behavior of commercial zinc-air battery.

EXAMPLE 2

The zinc-air battery used in this example is similar to that used in Example 1 with the same zinc anode and air electrode. In this battery, a 30.0 wt. % sodium borohydride and 3.0 wt. % sodium hydroxide aqueous solution is used as reducing material and electrolyte.

The open circuit voltage is measure to be about 1.6 V, which is close to the value of zinc-air battery. When the anode and cathode is electrically connected with a load, the electric current density started to be about 200 mA/cm$^2$ of anode, and decrease gradually to about 50 mA/cm$^2$, and is stable at this value. As compared to the result in Example 1, the result in Example 2 shows that the reducing material starts to regenerate the anode, thereby regenerating and removing the oxidized species, and allowing the anode to continue to generate electric current. The stable electric current density is higher than that of regular zinc-air battery. The lifetime of the battery with reducing materials is extended to a much longer time.

Having thus described the invention, it should be apparent that numerous modifications and adaptations may be resorted to without departing from the scope and fair meaning of the instant invention as set forth hereinabove and as described herein by the claims.

What is claimed is:

1. A metal-air storage battery system for producing electric current, and said metal-air storage battery system comprising an anode, a cathode, an electrolyte, a separator, and a battery anode supplying compartment, wherein said anode is continuously regenerated in-situ and on-time for continuous function while said anode is consumed during discharge that concurrently generate electric current;

said battery anode supplying compartment comprising: at least one type of reducing materials for regeneration of said anode, said electrolyte, and a material for stabilizing said reducing materials;

said anode comprising at least one type of metal, yields electric current and is oxidized to form at least one type of oxidized species, and said oxidized species is regenerated in-situ and on-time continuously by said reducing materials in said battery anode supplying compartment in contact with said anode;

said cathode comprising oxygen, and/or air, an electrode catalyst, and a current carrier;

said separator separates said anode and said reducing materials with said cathode;

and said metal-air storage battery system further comprising an external supplying device to replace consumed said reducing materials.

2. The metal-air storage battery system of claim 1 is a zinc-air storage battery system, wherein said anode comprises zinc, or an alloy of zinc, or a mixture of zinc with other types of metal, or a combination thereof; and said cathode comprises air, a gas diffusion electrode catalyst, and the current carrier.

3. The metal-air storage battery system of claim 1, wherein the reducing materials comprise of borohydrides, aluminum hydrides, or a combination thereof.

4. The metal-air storage battery system of claim 3, wherein the borohydrides comprise of lithium borohydride, sodium borohydride, potassium borohydride, and a combination thereof.

5. The metal-air storage battery system of claim 3, wherein the aluminum hydrides comprise lithium aluminum hydride, sodium aluminum hydride, potassium aluminum hydride, or a combination thereof.

6. The metal-air storage battery system of claim 1, wherein the electrolyte comprises of hydroxide ions.

7. The metal-air storage battery system of claim 1, wherein the reducing materials are mixed with the electrolyte as a solution.

8. The metal-air storage battery system of claim 1, wherein a selective semi-permeable membrane separator separates the anode, the reducing materials and the electrolyte with the cathode, a gas diffusion electrode catalyst, and the current carrier;
   said permeable membrane separator is permeable for hydroxyl ions, metal ions, but is impermeable for borohydride ions and aluminum hydride ions.

9. The metal-air storage battery system of claim 1, wherein the anode comprises at least one type of metal form Periodic Table Group VIII, Group IB, Group IIB, Group IIIA, Group IVA, or alloys of said metals, or mixtures of said metals, or a combination thereof.

10. A series of the metal-air storage battery systems of claim 1 are connected in series, in parallel, or a combination thereof;
   wherein the anode and the cathode in said battery systems are connected in series, in parallel, or a combination thereof;
   and the reducing materials are separated by walls of each battery cell compartment.

11. A method of recharging a metal-air storage battery system for continuous producing of electric current, using an external supplying device to replace consumed materials by inserting said external supplying device into a designed compartment of said battery;
   said battery system comprising an anode, a cathode, and electrolyte, a separator, a battery anode supplying compartment, wherein said anode is continuously regenerated in-situ and on-time for continuous function while said anode is consumed during discharge that concurrently generates electric current;
   said battery anode supplying compartment comprising: at least one type of reducing materials for regeneration of said anode, said electrolyte, and a material for stabilizing said reducing materials;
   said separator separates said anode and said reducing materials with said cathode;
   said anode yields electric current and is oxidized to form at least one type of oxidized species, and said oxidized species is regenerated in-situ and on-time continuously by said reducing materials in said battery anode supplying compartment in contact with said anode;
   said external supplying device, wherein the at least one type to reducing materials, the electrolyte material, or a combination thereof are stored in a form of dry powders or solutions;
   and said external supplying device comprises a gas relief device to control a designed pressure in said device, and injection port to input a solvent to make the stored dry powders in the solution, and an open-close gate for said reducing materials to access said anode.

12. The method of claim 11, wherein the supplying device can be inserted and removed from the battery compartment.

13. The method of claim 11, wherein the supplying device has a flexible and expandable case.

14. The method of claim 11, wherein the supplying device, when used up in the battery, is removed form the battery compartment with the open-close gate closed, and a new supplying device of the same type is expanded and inserted into a position of said battery compartment, and the solvent is injected into said new supplying device, and said open-close gate is opened for use.

15. The method of claim 11, wherein the solvent is water.

* * * * *